United States Patent [19]

Egawa et al.

[11] Patent Number: 4,890,125

[45] Date of Patent: Dec. 26, 1989

[54] IMAGE FORMING APPARATUS FOR CONTROLLING IMAGE FORMING OPERATION IN ACCORDANCE WITH STATE OF CHARGER

[75] Inventors: Jiro Egawa, Yokosuka; Naoaki Ide, Yokohama, both of Japan

[73] Assignee: Kabushiki Kaisha Toshiba, Kawasaki, Japan

[21] Appl. No.: 221,535

[22] Filed: Jul. 19, 1988

[30] Foreign Application Priority Data

Jul. 22, 1987 [JP] Japan ................................ 62-180959
Jul. 22, 1987 [JP] Japan ................................ 62-180960

[51] Int. Cl.$^4$ ............................................ G01D 15/00
[52] U.S. Cl. .................................. 346/160; 346/160.1
[58] Field of Search ..................... 346/160.1, 160, 154; 355/214, 227, 224, 216

[56] References Cited

U.S. PATENT DOCUMENTS 4,748,465 5/1988 Tsilibes et al. ................... 346/160.1

*Primary Examiner*—Arthur G. Evans

*Attorney, Agent, or Firm*—Foley & Lardner, Schwartz, Jeffery, Schwaab, Mack, Blumenthal & Evans

[57] ABSTRACT

An image forming apparatus according to this invention includes a main charger for uniformly charging a surface of a photoconductive drum, an electrostatic latent image forming unit for forming an electrostatic latent image on the drum charged by the main charger, a developing unit for making visible the electrostatic latent image formed on the drum by the electrostatic latent image forming unit, and a transfer charger for transferring the image made visible by the developing unit onto a paper sheet. Power supply circuits supply operation voltages to the main charger and the transfer charger, and currents flowing from the power supply circuits to the main charger and the transfer charger are detected by current detectors. The current values detected by the current detectors are compared with corresponding predetermined values by comparators. A controller controls operations of the electrostatic latent image forming unit and the power supply circuits in accordance with the comparison results from the comparators. When the detected current is abnormal, the controller stops the operations.

21 Claims, 14 Drawing Sheets

IMAGE FORMING APPARATUS FOR CONTROLLING IMAGE FORMING OPERATION IN ACCORDANCE WITH STATE OF CHARGER

BACKGROUND OF THE INVENTION

1. Field of the Invention

The present invention relates to an image forming apparatus and, more particularly, to an image forming apparatus for controlling an image forming operation in accordance with a current detection state of a main charger in a laser printer, copying machine, or the like employing an electrophotography process.

2. Description of the Related Art

As a conventional image forming apparatus, a so-called laser printer is developed, which has a cycle of printing by scanning exposure by a laser beam and an electrophotography process. Such a laser printer comprises a drum-like photoconductive body. A main charger, exposure unit, developing unit, transfer charger, peeling charger, discharger (discharging lamp), and the like are sequentially arranged around the photoconductive body along its rotating direction. The surface of the photoconductive body is uniformly and negatively charged by the main charger, and is then reversely exposed by a laser beam in the exposure unit. Thus, an electrostatic latent image in which only an information region is substantially at 0 V is formed. The latent image is reversely developed by a negatively charged toner in the developer, thereby visualizing the latent image. As a result, a toner image is formed. The toner image is transferred onto a paper sheet by the transfer charger having a polarity (positive polarity) opposite to that of the toner. Thereafter, the paper sheet is peeled from the photoconductive body by the peeling charger. In addition, the latent image on the photoconductive body is discharged (erased) by the discharger, thus completing one cycle.

After the image formation cycle is completed, the main charger, transfer charger, and peeling charger are sequentially turned off at predetermined timings. After the peeling charger is turned off, rotation of the photoconductive body is stopped by the discharger for at least an interval corresponding to one revolution of the photoconductive body, thus completing the cycle.

In the apparatus with the above arrangement, a defective image may be formed due to abnormality of a charging means and transfer means, such as a mounting error of the main charger, transfer charger, or the like, mis-contact between the main charger and the transfer charger and their power feeding units, disconnection of a discharging wire of the main charger, or the like. In this case, each time such a defective image is formed, an operator must find it (TOSHIBA LASER BEAM PRINTER TN-7700).

However, with this method, since the operator often leaves the apparatus, especially, the laser printer, he often fails to find any defective image, and many defective images are undesirably formed. An abnormality of the main charger when reversal development is employed causes a defective image, called a solid black image, and a large amount of toner is used. In recent developing units, the photoconductive body is cleaned simultaneously with reversal development. When a developing unit having two functions is used, since a large amount of toner consumed due to a solid black defective image or a large amount of toner which is not transferred due to the abnormality of the transfer means and remains on the photoconductive body overcomes cleaning capability, the cleaning function cannot be satisfactorily effected.

SUMMARY OF THE INVENTION

Accordingly, it is an object of the present invention to provide an image forming apparatus which can prevent formation of a defective image even if an abnormality of a main charger occurs, can prevent use of a large amount of toner in reversal development, and can be free from the trouble of a cleaning function even if a developing means having a function of simultaneously performing reversal development and cleaning is used.

According to an aspect of the present invention, there is provided an image forming apparatus having an image carrier comprising charging means for charging the surface of the image carrier, means for detecting an abnormality of the charging means, and means for controlling the charging of the charging means in accordance with the detecting means.

According to another aspect of the present invention, there is provided an image forming apparatus having an image carrier comprising charging means for uniformly charging the surface of the image carrier, power supply means for supplying an operation voltage to the charging means, detection means for detecting a current flowing from the power supply means to the charging means, comparison means for comparing the current value detected by the current detection means with a predetermined value, and means for controlling the charging of the charging means in accordance with the comparison result from the comparison means.

According to still another aspect of the present invention, there is provided a laser printer comprising an image carrier on which an electrostatic latent image is to be formed, charging means for uniformly charging a surface of the image carrier, electrostatic image forming means for forming the electrostatic latent image on the image carrier, developing means for visualizing the electrostatic latent image formed on the image carrier by the electrostatic latent image forming means, transfer means for transferring the image visualized by the developing means to a recording medium, first and second power supply means for supplying operation voltages to the charging means and the transfer means, first and second current detection means for respectively detecting currents flowing from the first and second power supply means to the charging means and the transfer means, first and second comparison means for comparing the current values detected by the first and second current detection means with corresponding predetermined values, and control means for controlling operations of the electrostatic latent image forming means and the first and second power supply means in accordance with the comparison results from the first and second comparison means.

BRIEF DESCRIPTION OF THE DRAWINGS

The manner in which the foregoing and other objects of the present invention are accompanying specification and claims considered together with the drawings, wherein:

DETAILED DESCRIPTION OF THE PREFERRED EMBODIMENTS

An embodiment of the present invention will be described hereinafter with reference to the accompanying drawings.

Figure 1:
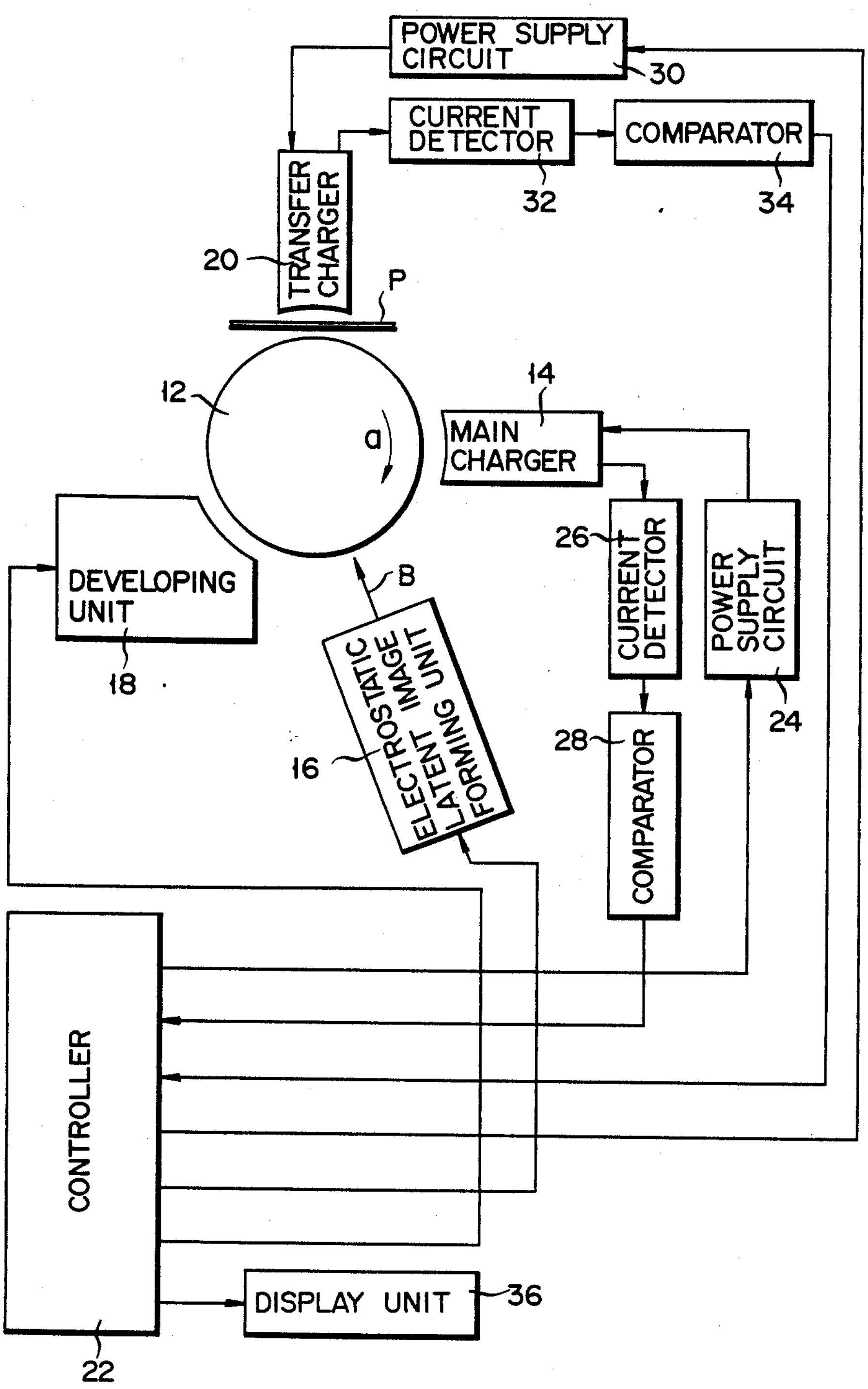
FIG. 1 is a block diagram showing a schematic arrangement of an image forming apparatus according to the present invention.

FIG. 1 is a block diagram showing a schematic arrangement of an image forming apparatus according to the present invention. The image forming apparatus employs a reversal development technique. Around drumlike photoconductive body 12 serving as an image carrier, main charger 14 for uniformly and negatively charging the surface of photoconductive body 12, electrostatic latent image forming unit 16 for forming an electrostatic latent image on the charged surface of photoconductive body 12 upon scanning of laser beam B, developing unit 18 for reversely developing the electrostatic latent image formed on the surface of photoconductive body 12 and simultaneously cleaning the surface of photoconductive body 12 to remove transfer residual toner remaining thereon, and transfer charger 20 for transferring the developed toner image on photoconductive body 12 onto paper sheet P as a recording medium are sequentially disposed in the rotating direction indicated by arrow a in FIG. 1. These units are controlled by controller 22 which controls the entire apparatus to perform predetermined operations.

Reference numeral 24 denotes a power supply circuit for supplying an operation voltage to main charger 14. Power supply circuit 24 is controlled by a control signal from controller 22. Reference numeral 26 denotes a current detector for detecting a current flowing through power supply circuit 24; and 28, a comparator for comparing the detection result from current detector 26 with a predetermined value and sending the comparison result to controller 22. Reference numeral 30 denotes a power supply circuit for supplying an operation voltage to transfer charger 20. Power supply circuit 30 is controlled by a control signal from controller 22. Reference numeral 32 denotes a current detector for detecting a current flowing through power supply circuit 30; and 34, a comparator for comparing the detection result from current detector 32 with a predetermined value and sending the comparison result to controller 22. Reference numeral 36 denotes a display unit for signaling an abnormality of main charger 14 and transfer charger 20. Display unit 36 is provided on, e.g., an operation panel. Display unit 36 is controlled by controller 22 in accordance with the comparison results from comparator 28 and 34.

With this arrangement, after the surface of photoconductive body 12 has been negatively charged by main charger 14, reversal development is performed upon scanning of laser beam B radiated by electrostatic latent image forming unit 16. Thus, an electrostatic latent image wherein only an information region of about 0 V is formed on the surface of photoconductive body 12. The latent image is reversely developed by negatively charged toner in developing unit 18 to be made visible, thus forming a toner image. In this case, developing unit 18 electrostatically removes (cleans) transfer residual toner remaining on photoconductive body 12 simultaneously with development. The toner image on photoconductive body 12 is transferred to paper sheet P by transfer charger 20 having a polarity (+) opposite to that of the toner, thus completing one cycle. Image formation may be continuously performed, if the abovementioned cycle is continually repeated.

After image formation has been completed, transfer charger 20 is first turned off. In this case, a positive charger is left on a portion on photo-conductive body 12 between transfer charger 20 and main charger 14. Therefore, after the surface of the photoconductive body 12 has been uniformly and negatively charged by main charger 14, main charger 14 is turned off. Controller 22 controls such that laser beam B radiated from electrostatic latent image forming unit 16 exposes the entire surface of photoconductive body 12 to discharge photoconductive body 12. Thereafter, the rotation of photoconductive body 12 is stopped. In this manner, post-processing is completed.

Current detector 26 detects a current flowing from power supply circuit 24 to main charger 14, and sends the detection result to comparator 28. Comparator 28 compares the detection result from current detector 26 with a predetermined value, and sends the comparison result to controller 22. In accordance with the comparison result, controller 22 controls not to start an image forming operation before image formation is started, and controls to stop the image forming operation during the image forming operation. In addition, controller 22 controls display unit 36.

Current detector 32 detects a current flowing from power supply circuit 30 to transfer charger 20, and sends the detection result to comparator 34. Comparator 34 compares the detection result from current detector 32 with a predetermined value, and sends the comparison result to controller 22. In accordance with the comparison result, controller 22 controls not to start an image forming operation before image formation is started, and controls to stop the image forming operation during the image forming operation, in the same manner as in comparator 28. In addition, controller 22 controls display unit 36.

More specifically, the predetermined values used by comparators 28 and 34 for comparing the detection result therewith are set to be values 30% or more of a rated current. For this reason, each of comparators 28 and 34 outputs a normality signal when the comparison result is larger than the predetermined value, and outputs an abnormality signal when the comparison result is smaller than the predetermined value. When controller 22 receives the abnormality signals from comparators 26 and 32, controller 22 controls not to start an image forming operation before image formation is started, and controls to stop the image forming operation during the image forming operation. In addition, controller 22 causes display unit 36 to perform a display operation, thereby signaling to an operator that main charger 14 or transfer charger 20 is abnormal.

The embodiment will be described by exemplifying a case wherein the present invention is applied to a laser printer.

Figure 2:
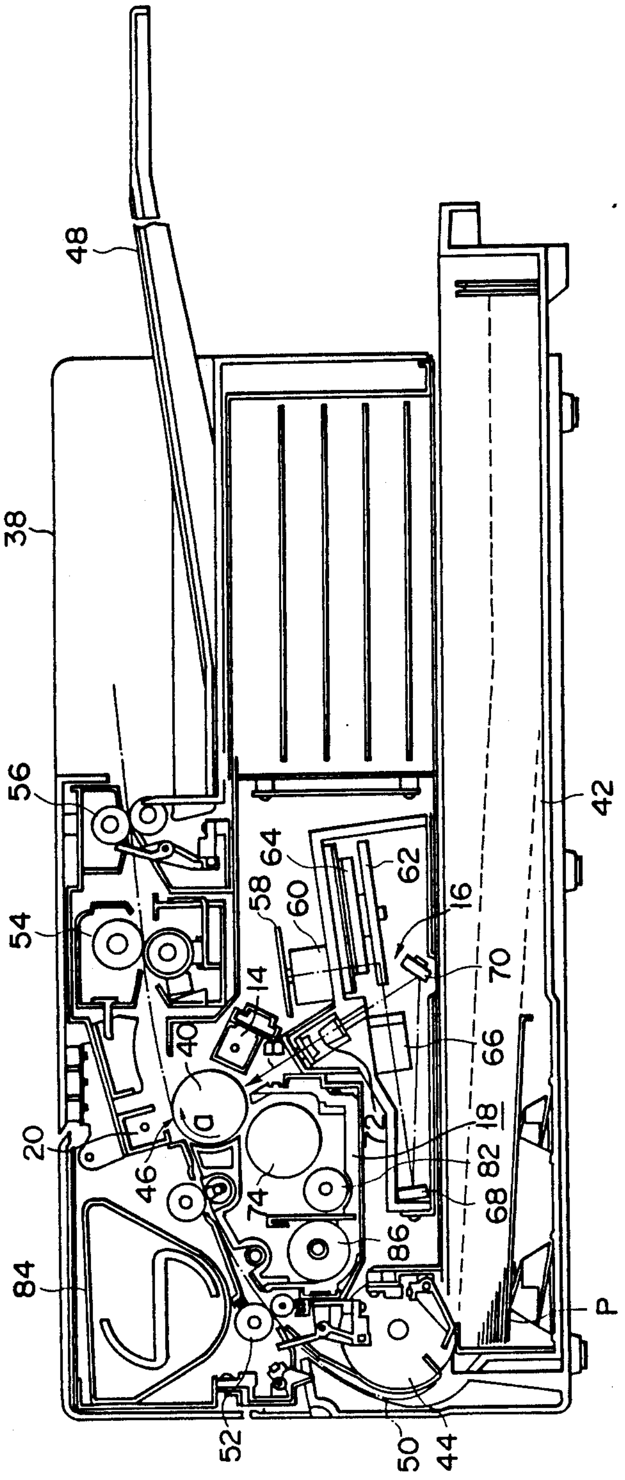
FIG. 2 is a sectional view schematically showing a laser printer to which the image forming apparatus according to the present invention is applied.

FIG. 2 is a schematic sectional view of a monochromatic laser printer of an electrophotographic system.

This laser printer is electrically coupled to a host system such as a computer and a word processor through a cable, and the like (not shown). The laser printer receives dot image data from the host system, writes the dot image data on a photosensitive body by modulating a laser beam, develops the written data, and then transfers the developed image onto paper.

More specifically, reference numeral 38 denotes a laser printer body. Photoconductive drum 40 as an image carrier is arranged in body 38. Drum 40 is rotated by a driving source (not shown) in a direction indicated by arrow a in FIG. 2. Main charger 14 of a charge control type, electrostatic latent image forming section 16, developing unit 18 for simultaneously performing developing and cleaning operations, and transfer charger 20 of a charge control type are sequentially arranged around drum 40 along its in the rotational direction thereof.

Feed cassette 42 is arranged in a lower portion of body 38, and convey path 50 is formed to guide paper P as a recording medium picked up by feed roller 44 from feed cassette 42 to discharge tray 48 arranged in an upper portion of body 38 through image transfer section 46 located between drum 40 and transfer charger 20. Aligning roller pair 52 is arranged on the upstream side of image transfer section 46 of convey path 50, and fixing unit 54 (heat roller) and discharge roller pair 56 are arranged on its downstream side.

Electrostatic latent image forming section 16 comprises semiconductor laser oscillator 58 (laser diode or the like) for generating laser beam B modulated in accordance with dot image data from the host system (not shown), lens system 60 such as a collimator lens for focusing laser beam B emitted from laser oscillator 58, and polyhedral rotary mirror 62 (polygon mirror) for scanning laser beam B focused by lens system 60. In addition, electrostatic latent image forming section 16 comprises mirror motor 64 for rotating rotary mirror at a high speed, $f\theta$ lens 66 for allowing laser beam B scanned by rotary mirror 62 to pass there through, reflecting mirrors 68 and 70 for reflecting laser beam B passing through $f\theta$ lens 66 toward drum 40, correction lens 72 for allowing laser beam B reflected by reflecting mirrors 68 and 70 to pass there through and guiding it toward the surface of drum 40, and a beam detector or the like to be described later for detecting laser beam B scanned by rotary mirror 62.

Figure 3:
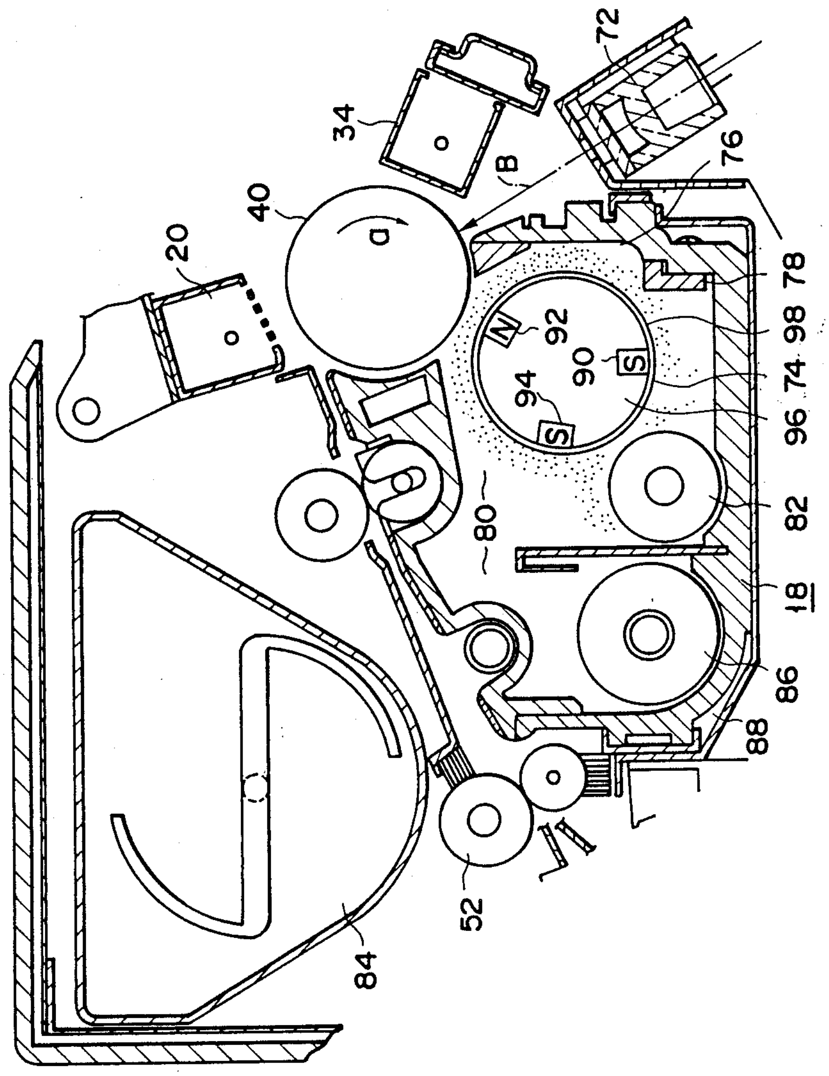
FIG. 3 is a sectional view showing in detail a developing unit and surrounding units shown in FIG. 2.

FIG. 3 shows developing unit 18 and its peripheral parts in detail. Developing unit 18 develops an image using a magnetic brush method employing a two-component developer consisting of a toner and a carrier. More specifically, developing unit 38 comprises developing roller 74, doctor blade 78 for limiting the thickness of developer, magnetic brush 76 formed on the surface of developing roller 74, developer agitator 82 arranged in developer storage 80, conveyor unit 86 for agitating and conveying toner replenished from toner replenishing section 84 (toner hopper), and casing 88 for housing these parts. Developing roller 74 comprises magnetic roll 96 incorporating three magnetic pole portions 90, 92, and 94, and sleeve 98 to be rotated counterclockwise around magnetic roll 96. Note that a predetermined bias voltage, e.g., about −400 V is applied to sleeve 98.

Developing unit 18 having such an arrangement is integrally formed with the photoconductive drum 32 into a unit so as to be detachably arranged in body 38.

Developing and cleaning operations simultaneously performed by developing unit 18 will be briefly described below.

When the latent image formed on photoconductive drum 40 has reached developing unit 18, toner is negatively charged in a non-exposed portion of drum 40 holding a surface potential of −600 V. Since the surface potential is higher than the bias potential of −400 V of developing unit 18, no toner flying occurs from developing roller 74 to drum 40, and no development is performed. However, when transfer residual toner remains on the non-exposed portion, the transfer residual toner is recovered toward developing roller 74 due to the potential difference between the surface and bias potentials. As a result, the surface of drum 40 is cleaned.

In an exposed portion of drum 40 holding a surface potential of about 0 V, toner flies from developing roller 74 to the exposed portion of drum 40 due to the potential difference there between. Development is thus performed.

The above-described developing unit is described in detail in, e.g., Japanese Patent Application No. 62-24605.

Figure 4:
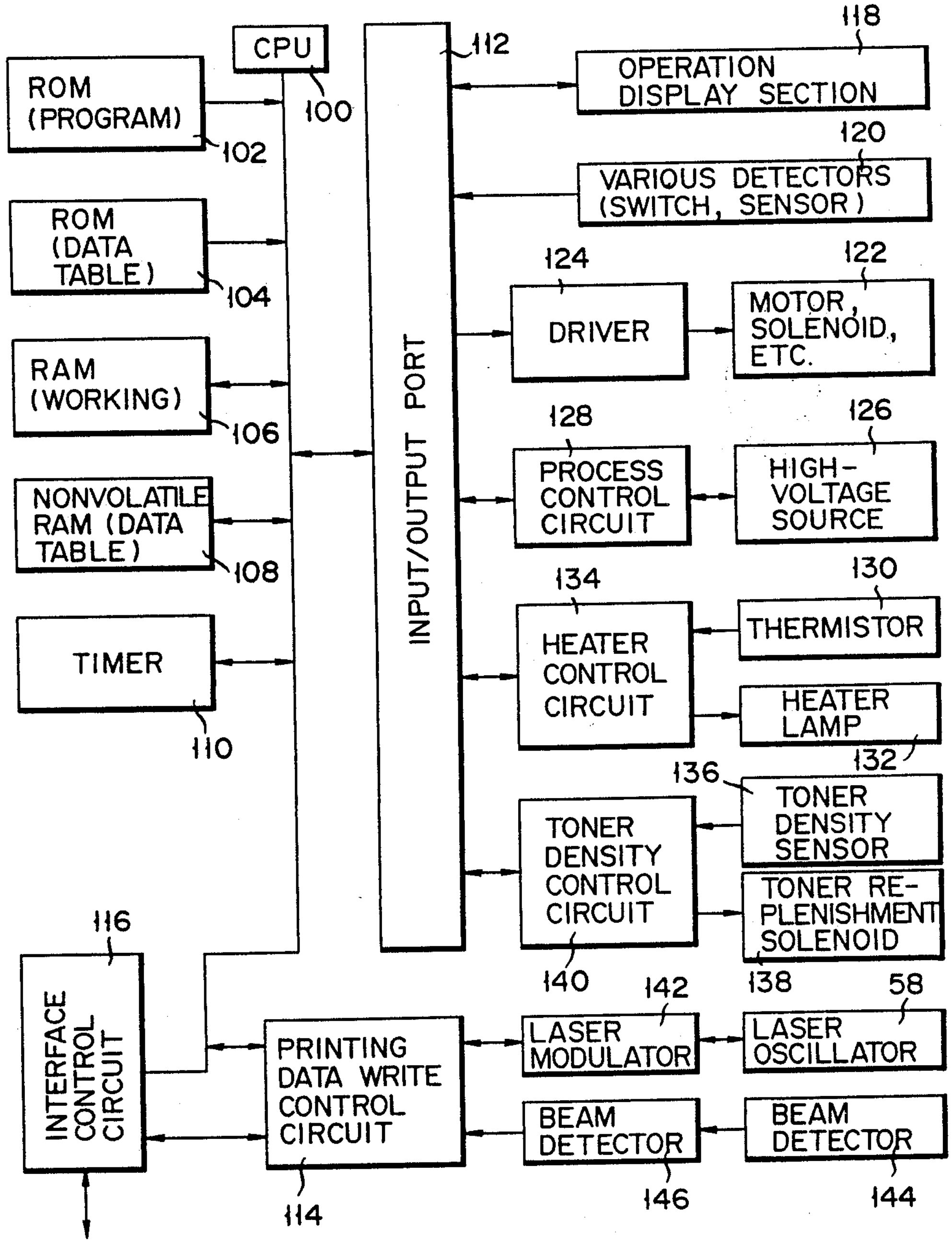
FIG. 4 is a block diagram showing an arrangement of a controller.

An arrangement of a control section of the laser printer having the above-described arrangement will be described with reference to FIG. 4. The control section comprises CPU (central processing unit) 100 serving as a control center, ROM (read-only memory) 102 for storing a system program, ROM 104 for storing a first data table, RAM 106 to be used as a working memory, erasable nonvolatile RAM 108 for storing a second data table, timer 110, input/output port 112, printing data write control circuit 114, and interface control circuit 116 for controlling the interface with the host system. Timer 110 is a general-purpose timer for generating a fundamental timing signal for controlling a paper convey and photosensitive body rotation process and the like.

Input/output port 112 outputs display data to operation display section 118, receives various switch data and data from various detectors (a microswitch, a sensor, and the like), outputs data to drive 124 for driving drive system 122 (various motors, clutches, solenoids, and the like), inputs/outputs, data from/to process control circuit 128 for controlling an output from high-voltage source 126 and the like, inputs/ outputs data from/to heater control circuit 134 for controlling the temperature of heater lamp 132 of fixing unit 54 in response to an output signal from temperature detecting element (thermistor or the like) 130 attached to fixing unit 54, and receives an output signal from toner density sensor 136 for measuring a toner density in developing unit 18 and inputs/outputs data to/from toner density control circuit 140 for controlling toner replenishment solenoid 138 which, in turn, replenishes toner to developing unit 18.

Printing data write control circuit 114 drives/ controls laser modulator 142 for performing light modulation control of laser oscillator 58, thereby writing printing data of a video image transferred from the host system at a predetermined position on drum 40. In this case, beam detector 144 detects laser beam B scanned by rotary mirror 62. Beam detector 146 generates a horizontal sync signal by shaping an output signal from detector 144, and outputs it to printing data write control circuit 114.

Interface control circuit 116 outputs status data to the host system, and receives command data and printing data from the host system.

Figure 5:
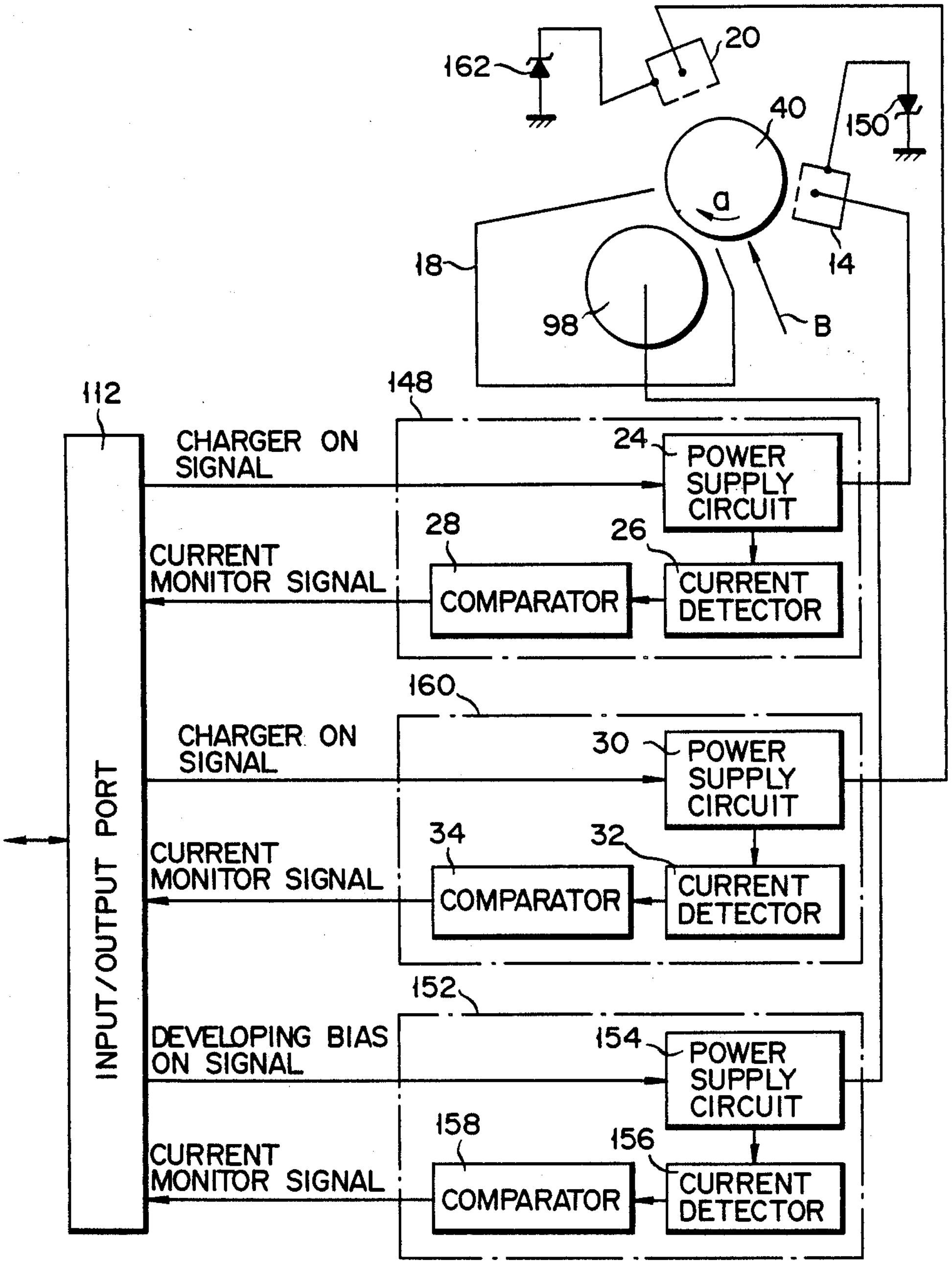
FIG. 5 is a diagram showing in detail a process control circuit and a high-voltage power supply.
Figure 6A:
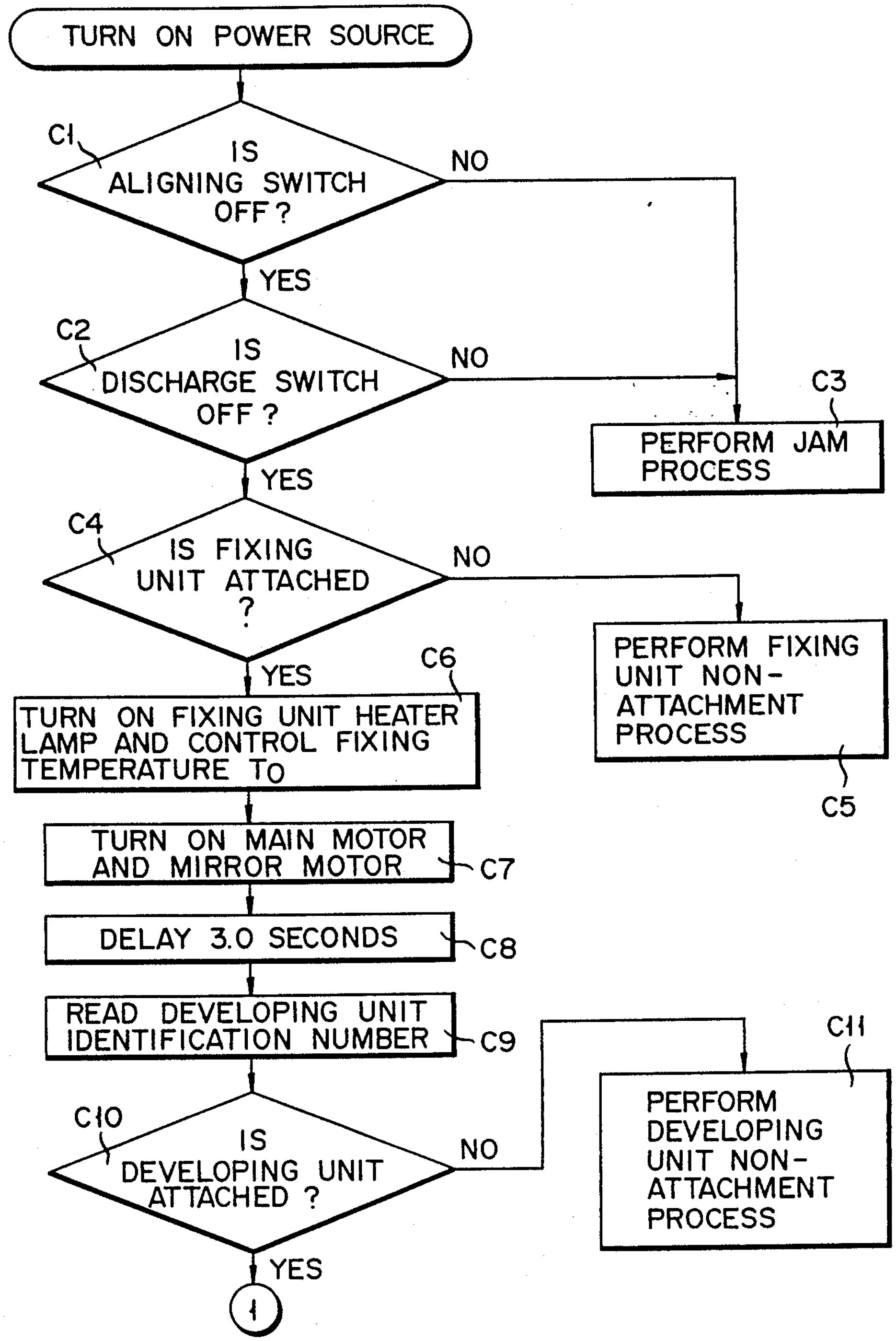
FIGS. 6A through 6I are flow charts showing the overall operation of the laser printer.
Figure 6B:
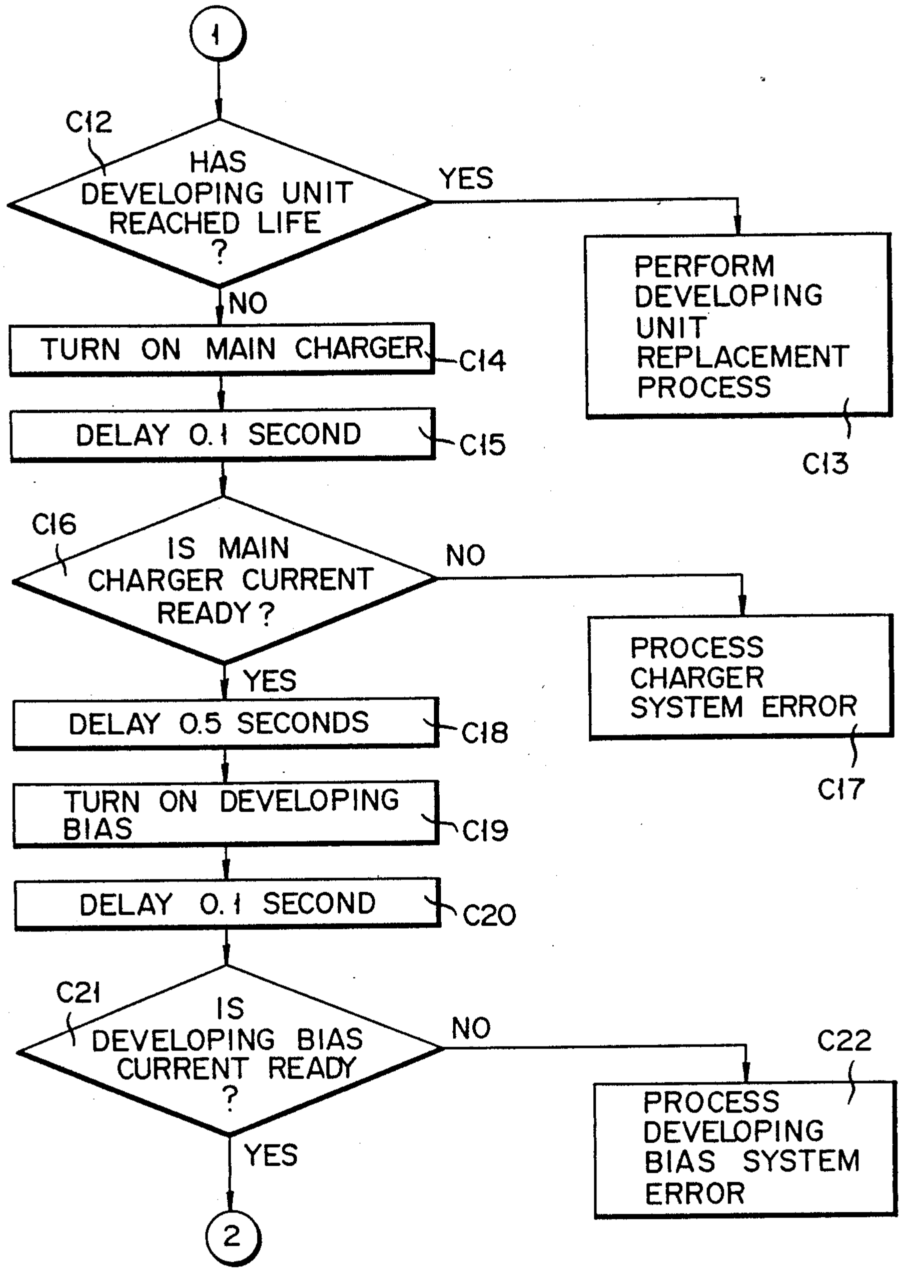
Figure 6C:
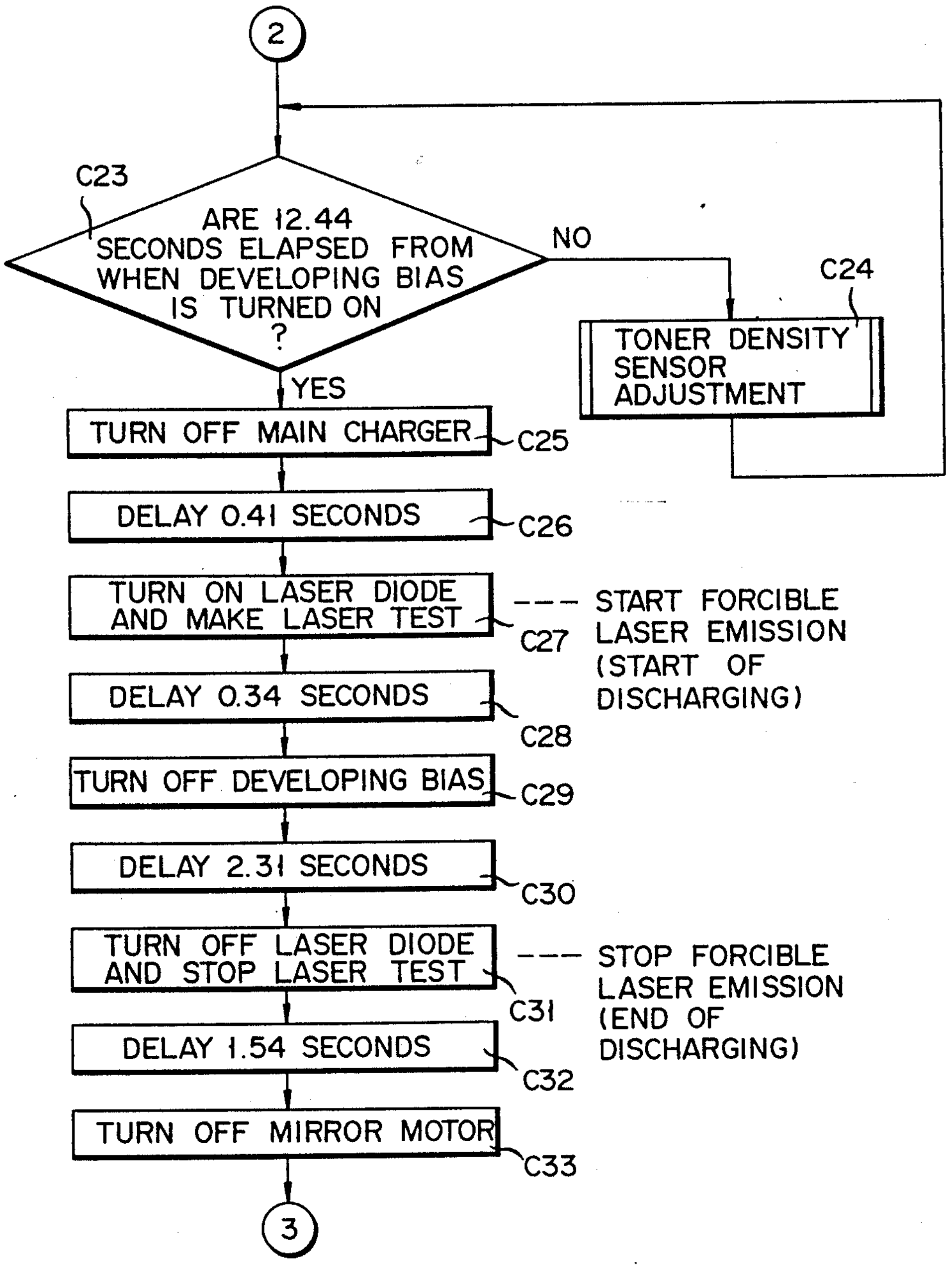
Figure 6D:
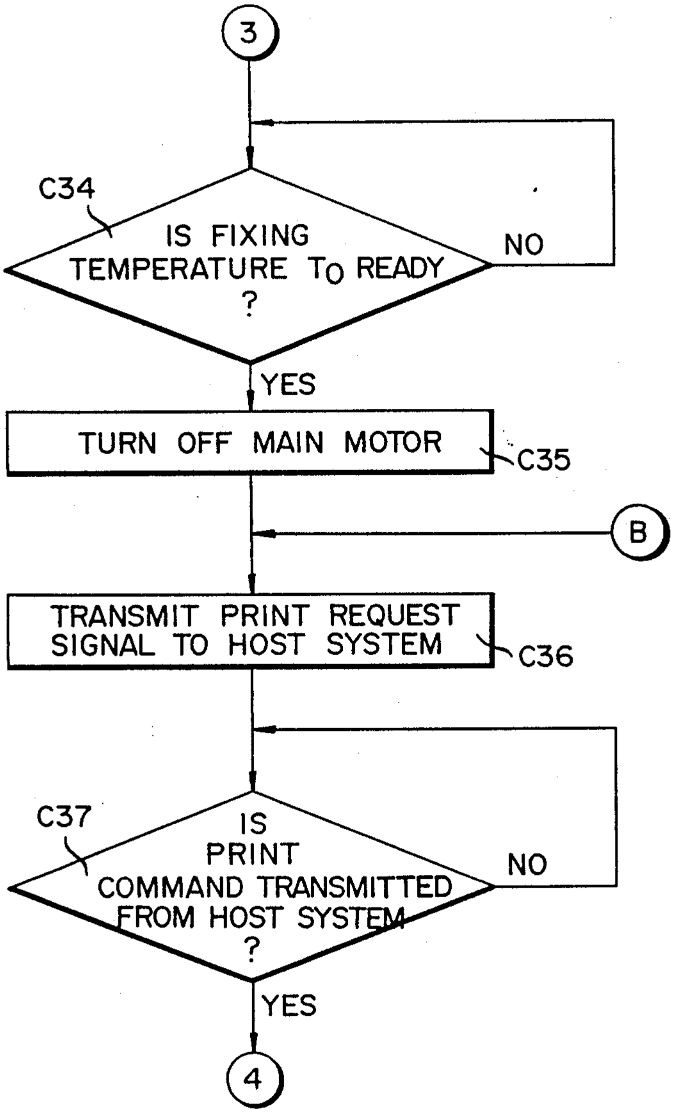
Figure 6E:
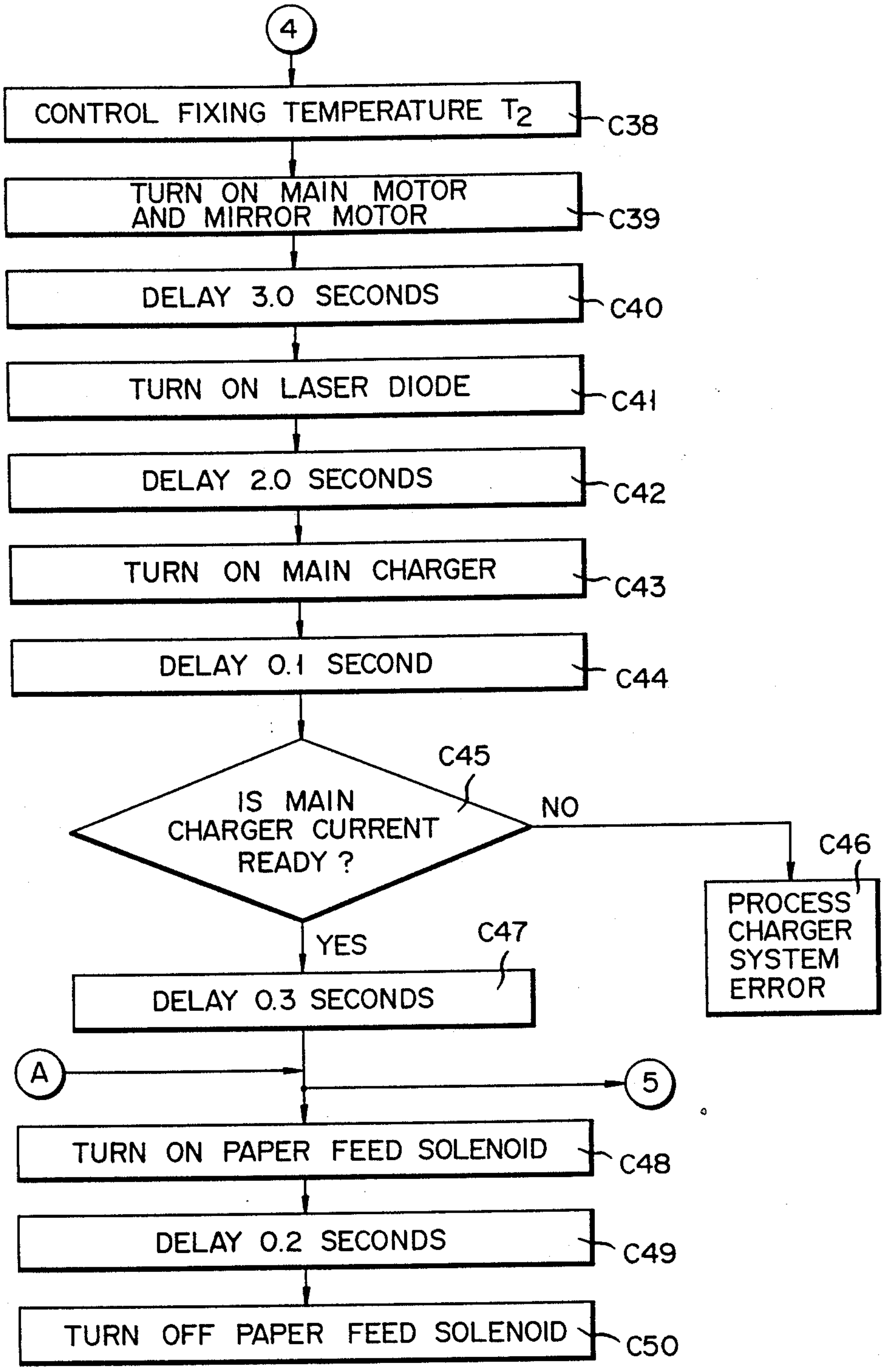
Figure 6F:
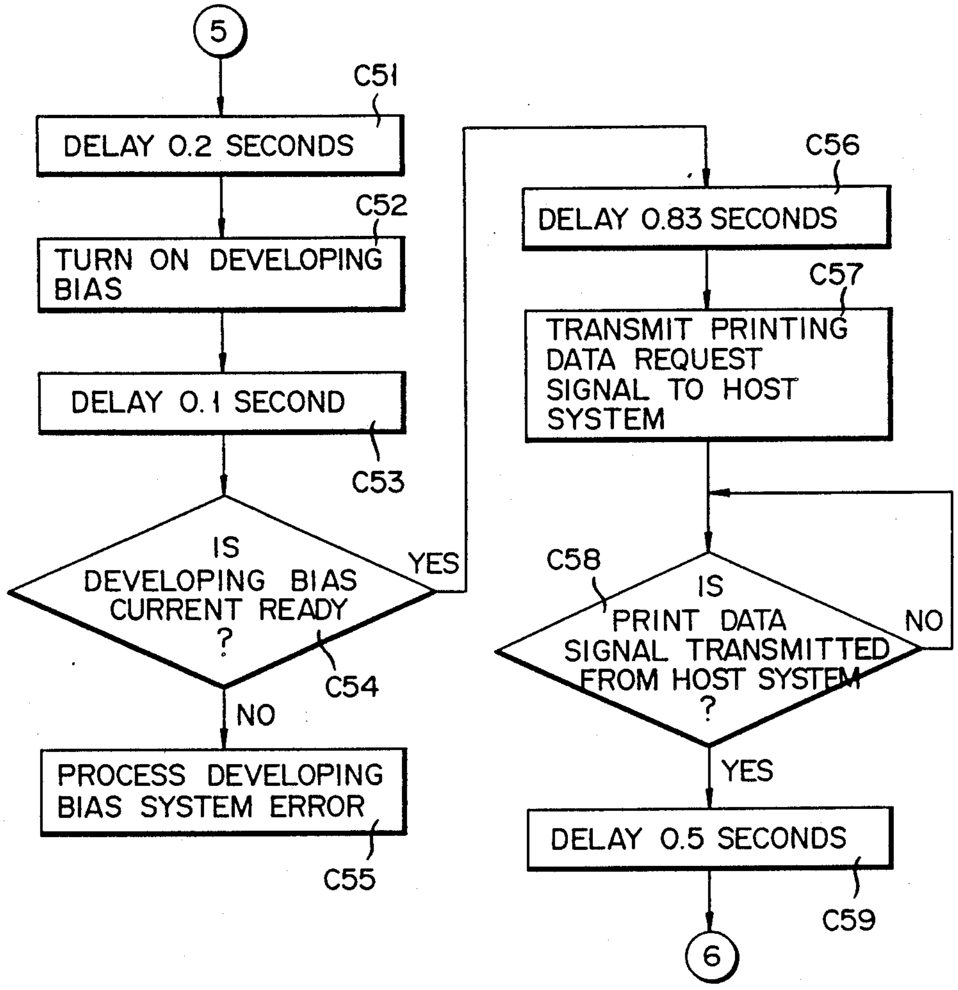
Figure 6G:
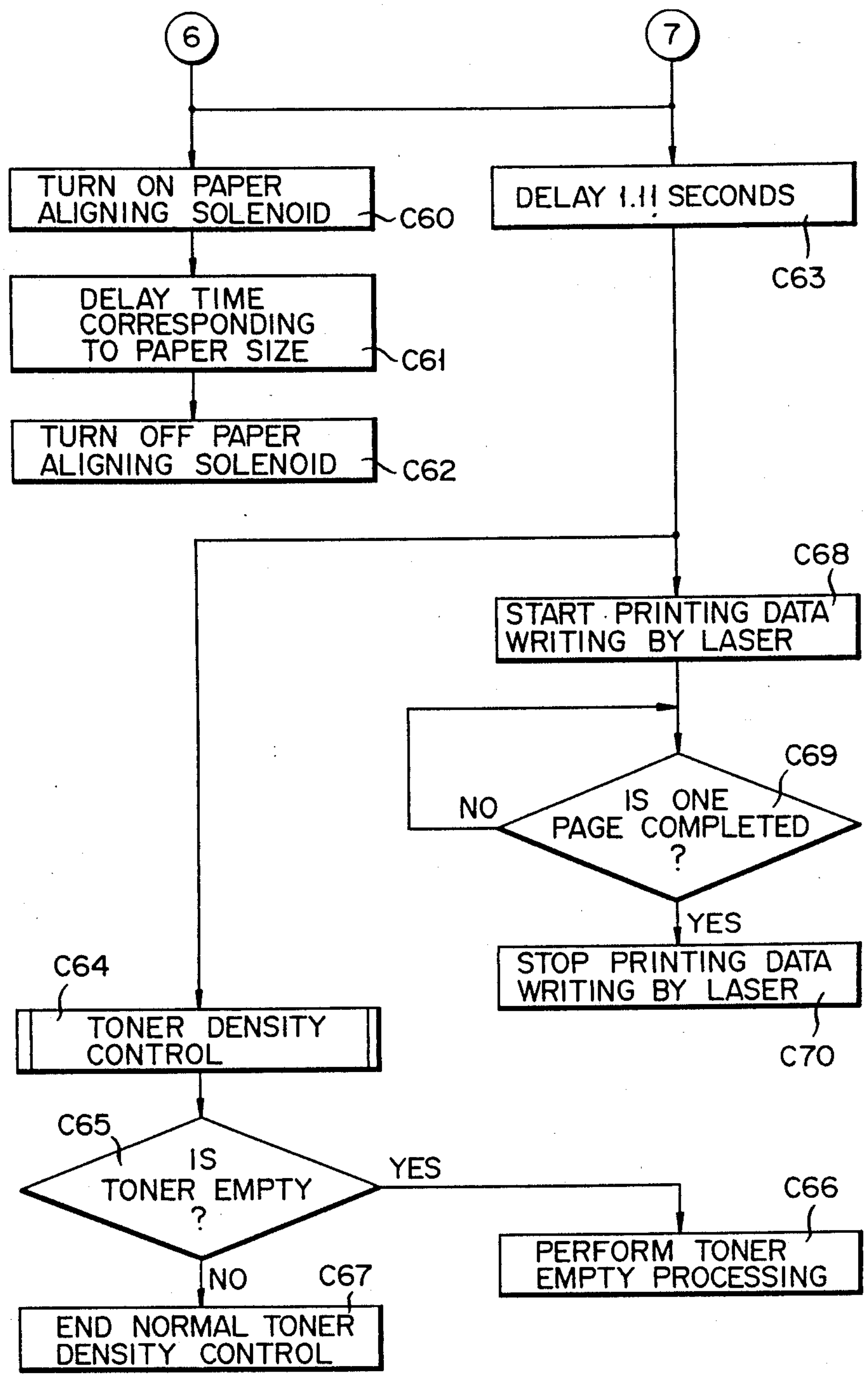
Figure 6H:
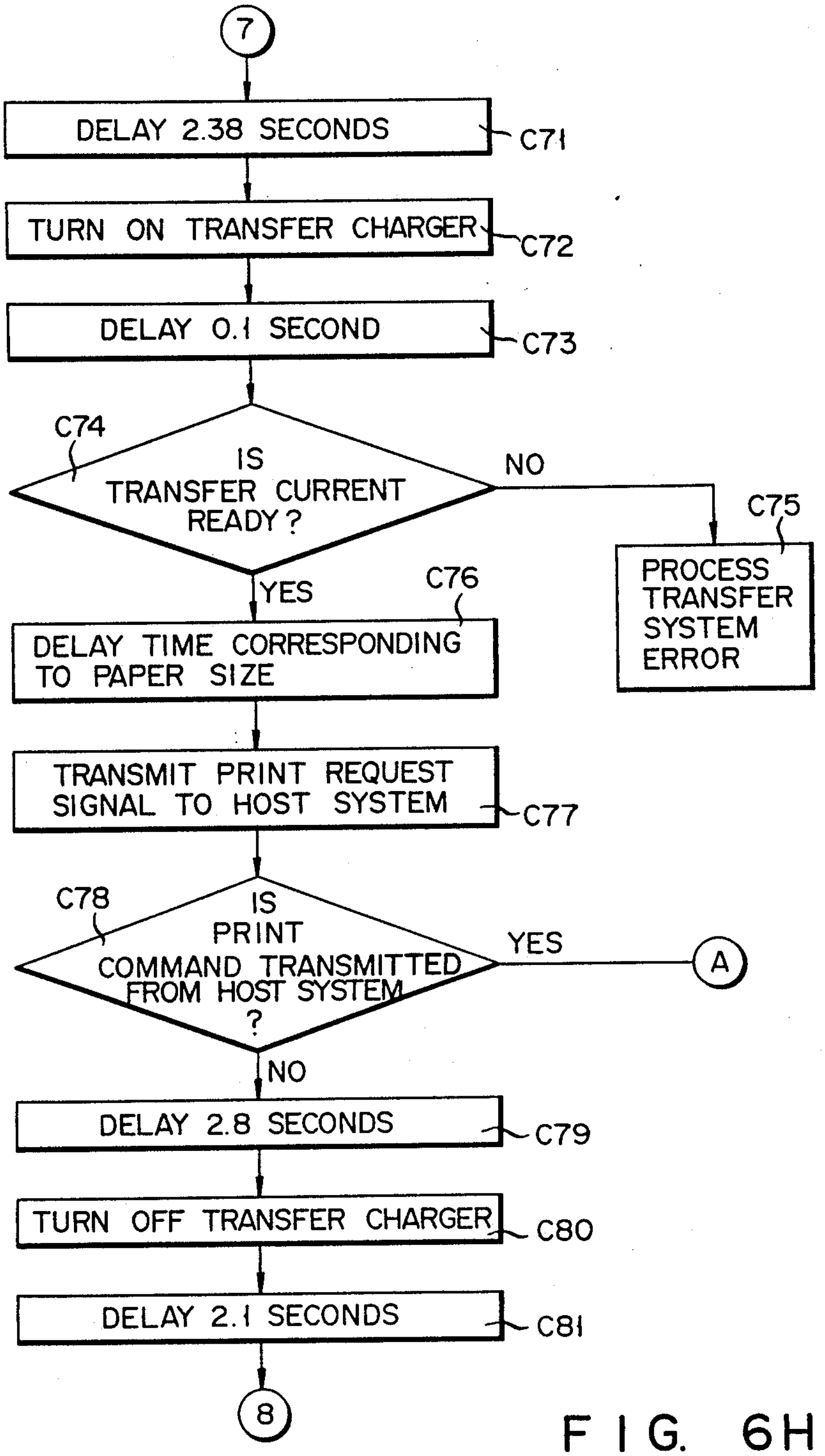
Figure 6I:
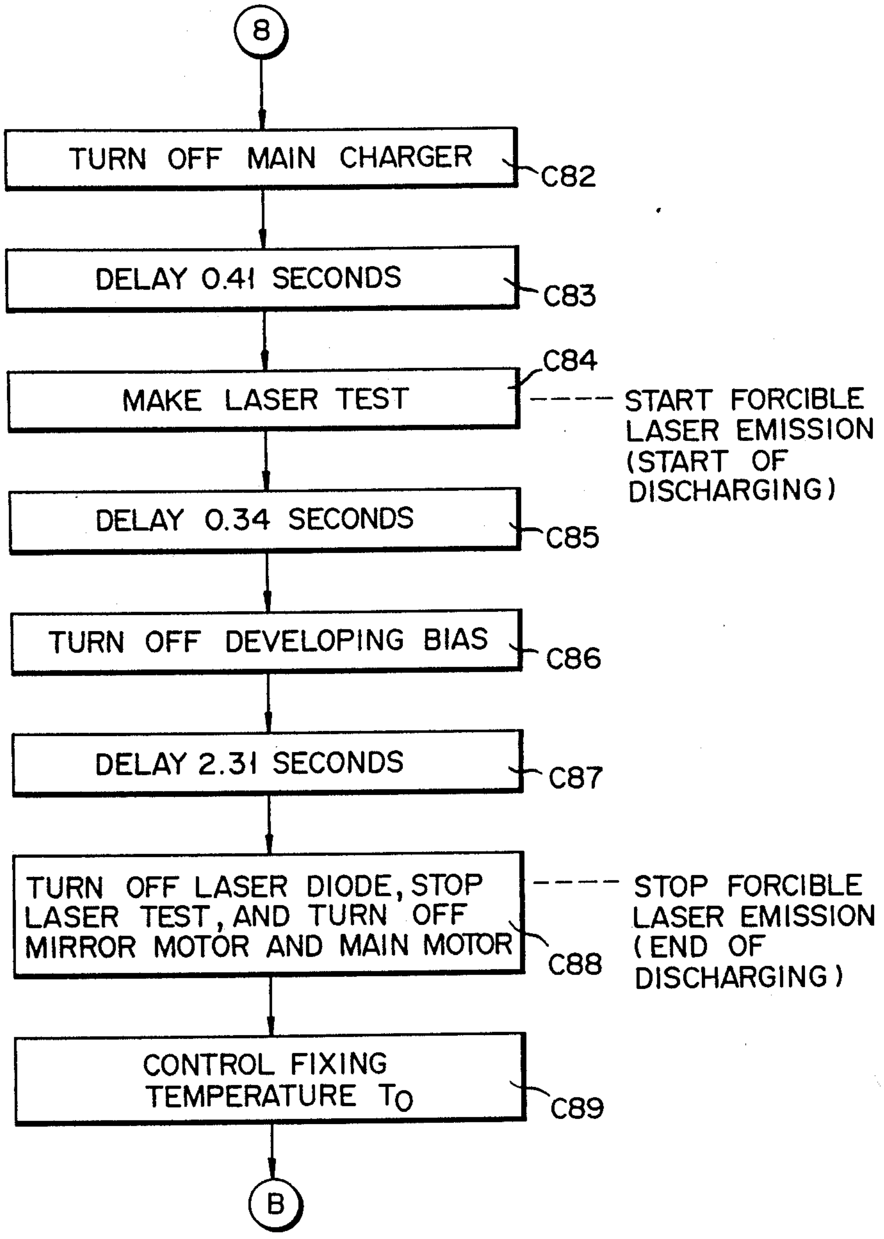

FIG. 5 is a block diagram showing process control circuit 128 and high-voltage power supply 126 in detail.

More specifically, the discharging wire of main charger 14 is coupled to a high-voltage output terminal of charging high-voltage power supply 148, and its case and grid are grounded through high-voltage zener diode 150. High-voltage power supply 148 comprises power supply circuit 24 for supplying a voltage to the discharging wire of main charger 14, current detector 26 for detecting a current flowing from power supply circuit 24 to the discharging wire of main charger 14, and comparator 28 for comparing the detection result from current detector 26 with a predetermined value and sending a current monitor signal corresponding to the comparison result to input/output port 112. Power supply circuit 24 is a constant current negative DC high-voltage power supply, and receives a charger ON signal, supplied from input/output port 112, for performing ON/OFF control of a high-voltage output, at its input. The current monitor signal goes to a ready state when the high-voltage output current from power supply circuit 24 exceeds about 30% of the rated current. More specifically, the predetermined value used in comparison of comparator 28 is set to be a value about 30% or more of the rated current. Only when the detection result from current detector 26 is larger than the predetermined value, comparator 28 sets the current monitor signal in the ready state.

Sleeve 98 of developing unit 18 is coupled to a high-voltage output terminal of developing bias high voltage power supply 152. Power supply 152 comprises power supply circuit 154 for supplying a high voltage to sleeve 98, current detector 156 for detecting a current flowing from power supply circuit 154 to sleeve 98, and comparator 158 for comparing the detection result from current detector 156 with a predetermined value and sending a current monitor signal corresponding to the comparison result to input/output port 112. Power supply circuit 154 is a constant current negative DC high-voltage power supply, and receives a developing bias ON signal, supplied from input/output port 112, for performing ON/OFF control of a high voltage output, at its input. The current monitor signal goes to a ready state when the high-voltage output current exceeds about 30% of the rated current. More specifically, the predetermined value used in comparison of comparator 158 is set to be a value about 30% or more of the rated current. Only when the detection result from current detector 156 is larger than the predetermined value, comparator 158 sets the current monitor signal in the ready state.

The discharging wire of transfer charger 20 is coupled to a high-voltage output terminal of transfer high-voltage power supply 160, and its case and grid are grounded through high-voltage zener diode 162. Transfer high-voltage power supply 160 comprises power supply circuit 30 for supplying a voltage to the discharging wire of transfer charger 20, current detector 32 for detecting a current flowing from power supply circuit 30 to the discharging wire of transfer charger 20, and comparator 34 for comparing the detection result from current detector 32 with a predetermined value and sending a current monitor signal corresponding to the comparison result to input/output port 112. Power supply circuit 30 is a constant current positive DC high-voltage power supply, and receives a charger ON signal, supplied from input/output port 112, for performing ON/OFF control of the high-voltage output, at its input. The current monitor signal goes to a ready state when the high-voltage output current from power supply circuit 20 exceeds about 30% of the rated current. More specifically, the predetermined value used in comparison of comparator 34 is set to be a value about 30% or more of the rated current. For this reason, only when the detection result from current detector 32 is larger than the predetermined value, comparator 34 sets the current monitor signal in the ready state.

Each current monitor signal described above is sent to CPU 100 through input/output port 112. CPU 100 checks each current monitor signal. As a result of checking, if the current monitor signal is not set in the ready state, CPU 100 determines that an abnormality has occurred, and performs abnormality processing. More specifically, CPU 100 controls not to start the image forming operation before image formation is performed, and controls to stop the image forming operation during the image forming operation. CPU 100 causes operation display unit 118 to display that main charger 14, developing unit 18, or transfer charger 20 is abnormal, thus signaling this to an operator.

An overall operation of the laser printer arranged in the above-described manner will be described with reference to the flow charts in FIGS. 6A through 6I.

When the laser printer is turned on, it is checked whether an aligning switch is OFF or not (step C1). If it is OFF, then, it is checked whether a discharge 25 switch is OFF or not (step C2). If the switches are in an ON state in steps C1 and C2, it means that paper P is present in convey path 50. then, the flow advances to step C3 and jam process is performed. If the switch is OFF in step C2, then, it is checked whether fixing unit 54 is attached or not (step C4). If it is not attached, an attachment process of unit 54 is performed (step C5). If unit 54 is attached, heater lamp 132 in unit 54 is turned on, and fixing temperature $T_0$ is controlled (step C6).

Subsequently, a main motor and mirror motor 64 are turned on (step C7), and the process is delayed by 3.0 seconds (step C8). Then, the identification number of developing unit 18 is read (step C9). It is checked whether developing unit 18 is attached or not (step C10). If it is not attached, an attachment process is performed (step C11). If it is attached, the service life of unit 18 is checked (step C12). If the service life of unit 18 has come to an end, a replacement process of unit 18 is performed (step C13). If it need not be replaced, main charger 14 is turned on (step C14), and the process is delayed by 0.1 second (step C15).

In step C16, a current of charger 14 is checked. If an error is found, the flow advances to step C17, and a charger system error is processed. If no error is found, the process is delayed by 0.5 seconds (step C18), and then a developing bias is turned on (step C19). In addition, the process is delayed by 0.1 second (step C20). Thereafter, a developing bias current is checked (step C21). If an error is found, a developing bias system error is processed (step C22). If no error is found, the flow advances to step C23.

In step C23, an elapsed time from when the developing bias is turned on is checked. If 12.44 seconds have not elapsed, the flow advances to step C24, and toner density sensor adjustment is performed. When this adjustment is finished, the flow returns to step C23, and an elapsed time is checked again. If 12.44 seconds have elapsed in step C23, main charger 14 is turned off (step C25). Then, the process is delayed by 0.41 seconds (step C26), and forcible laser emission is started (start of discharging) (step C27). More specifically, laser diode 58 is turned on and a laser test is made. Then, the process is delayed 0.34 seconds (step C28), and the developing bias is turned off (step C29). After the process is delayed by 2.31 seconds (step C30), laser diode 58 is turned off and the laser test is stopped. That is, forcible laser emission is stopped. (end of discharging) (step C31).

Upon completion of discharging, the process is delayed by 1.54 seconds (step C32), and then mirror motor 64 is turned off (step C33). Fixing temperature $T_0$ controlled in step C6 is checked (step C34). Checking is repeated until the fixing temperature reaches $T_0$. When YES is obtained in step C34, the main motor is turned off (step C35).

A print request signal is supplied to the host system (step C36). Then, checking is repeated until a print command is supplied from the host system (step C37). When the print command is supplied from the host system, fixing temperature T2 is controlled in step C38, and the main motor and mirror motor 64 are turned on in step C39. After the process is delayed by 3.0 seconds in step C40, laser diode 58 is turned on in step C41. The process is delayed by 2.0 seconds, charger 14 is turned on (step C43), and then the process is delayed by 0.1 second (step C44).

In step C45, a charger current is checked. If an error is found, the flow advances to step C46, and charger system error is processed. If no error is found, the flow advances to step C47, and the process is delayed by 0.3 seconds. A paper feed solenoid is turned on in step C48, and the processed is delayed by 0.2 seconds (step C49). Then, the paper feed solenoid is turned off (step C50). After step C47, the flow advances to step C51 and the process is delayed by 0.2 seconds. After the developing bias is turned on (step C52) and the process is delayed by 0.1 second (step C53), a developing bias current is checked in step C54. If an error is found, a developing bias system error is processed (step C55). If no error is found, after the processed is delayed by 0.83 seconds (step C56), a print data request signal is supplied to the host system (step C57). Then, it is checked whether signal is supplied from the host system (step C58). The operation in step C58 is repeated until the signal is obtained.

When the print data transmission signal is obtained in this manner, the process is delayed by 0.5 seconds (step C59), and then the paper aligning solenoid is turned on (step C60). The process is delayed by a period of time corresponding to a paper size (step C61), and the paper aligning solenoid is turned off (step C62).

The process is delayed by 1.11 seconds in step C63 simultaneously with the operation in step C60. Thereafter, toner density control is performed in step C64. After the toner density control is completed it is checked whether the toner is empty (step C65). If it is empty, a toner empty process is performed (step C66). If it is not, the flow advances to step C67, and the toner density control is ended.

After the process is delayed in step C63, writing of printing data is started using a laser in step C68. Then, it is checked in step C69 whether one page is completed. After checking is repeated in step C69 until one page is completed, printing data writing by means of the laser is stopped (step C70).

After the operation in step C59, the flow advances to step C71 as well as to steps C60 and C63 so as to delay the process by 2.38 seconds. Then, charger 20 is turned on (step C72). After the process is delayed by 0.1 second (step C73), a current of transfer charger 20 is checked (step C74). If an error is found in step C74, a transfer system error is processed (step C75). If no error is found, the process is delayed by a period of time corresponding to a paper size (step C76). Subsequently, a print request signal is supplied to the host system (step C77). The presence/absence of a print command from the host system is checked (step C78). If YES in step C78, the flow returns to steps C48 and C51.

If NO in step C78, the process is delayed by 2.8 seconds in step C79 and transfer charger 20 is turned off (step C80). The process is delayed by 1.2 seconds (step C81), and main charger 14 is turned off (step C82). Then, the process is delayed by 0.41 seconds (step C83), and forcible laser emission is started (start of discharging). That is, a laser test is made (step C84). In step C85, the process is delayed by 0.34 seconds. In step C86, the developing bias is turned off. In addition, in step C87, the process is delayed by 2.31 seconds. Subsequently, in step C88, forcible laser emission is stopped (end of discharging). That is, laser diode 58 is turned off, and at the same time, the laser test is stopped, and mirror motor 64 and the main motor are turned off. If discharging is completed in this manner, fixing temperature T0 is controlled in step C89. Then, the flow advances to step C36.

More specifically, when a print start signal is supplied from the host system, photoconductive drum 40 is rotated and is uniformly charged by main charger 14 such that its surface potential is set to be, e.g., $-600$ V. When dot image data is supplied from the host system, laser beam B modulated in accordance with the dot image data is emitted to electrostatic latent image forming section 16. Then, the surface of charged drum 32 is scanned/exposed with laser beam B to form an electrostatic latent image on the surface of drum 40. The electrostatic latent image formed on drum 40 is reversely developed by developing unit 18 and is formed into a toner image. In this case, developing unit 18 removes (cleans) residual toner on drum 40 upon transfer simultaneously with the reversely developing operation. The toner image on drum 40 is transferred onto paper P conveyed by feed cassette 42 in image transfer section 46 by the effect of transfer charger 20. Paper P having the toner image transferred thereon is conveyed to fixing unit 54, and the toner image is fixed. Thereafter, paper P is discharged onto discharge tray 48 by discharge roller pair 56.

Upon completion of the image forming operation, discharging of drum 40 is performed by electrostatic latent image forming section 16. More specifically, transfer charger 20 is turned off. At this time, positive charges due to transfer charger 20 are still left on drum 40 between transfer charger 20 and main charger 14. For this reason, after the surface of drum 40 is uniformly charged with negative charges by main charger 14, main charger 14 is turned off. Then, laser oscillator 58 is operated to emit light (light modulation is not performed). At the same time, rotary mirror 62 is rotated, and the entire surface of drum 40 is exposed with laser beam B scanned by rotary mirror 62, thereby discharging drum 40. Subsequently, the rotation of drum 40 is stopped and this process is completed. These control operations are performed by the control section using CPU 100 shown in FIG. 4 as a main controller.

According to this embodiment, when troubles such as a mounting error of the main charger and transfer charger, mis-contact between the main charger and the transfer charger and their power feeding units, disconnection of the discharging wire of the transfer charger, or the like occur, no current can flow from each power supply circuit to the corresponding charger. If it flows, the current cannot reach a normal current value, and the abnormality can be detected by the corresponding current detector and comparator. The control operation is performed such that the image forming operation is not started before image formation is performed, and the image forming operation is stopped during the image forming operation. In addition, the display unit signals generation of an abnormality. Thus, formation of an undesirable defective image can be prevented unlike in a conventional apparatus. In the case of reversal development, use of a large amount of toner can be prevented. Furthermore, when the developing unit for simultaneously performing reversal development and cleaning is used as in this embodiment, the cleaning function is not disturbed.

What is claimed is:

1. An image forming apparatus having an image carrier comprising:
- charging means for uniformly charging the surface of said image carrier;
- power supply means for supplying an operation voltage to said charging means;
- detection means for detecting a current flowing from said power supply means to said charging means;
- comparison means for comparing a current value detected by said current detection means with a predetermined value; and
- means for stopping an image forming operation of the apparatus when the detected current value is different form the predetermined value.

2. An apparatus according to claim 1, further comprising alarming means for signaling a state of the current flowing to the charging means in accordance with the comparison result from said comparison means.

3. An apparatus according to claim 2, wherein, when said comparison means detects that the current value is lower than the predetermined value, said control means stops an image forming operation of said electrostatic latent image forming means and causes said alarming means to signal that the current flowing to said charging means is abnormal.

4. An apparatus according to claim 3, wherein said alarming means comprises an operation display unit for displaying a state of the current flowing to said charging means.

5. An apparatus according to claim 3, wherein said developing means makes visible the electrostatic latent image formed on the surface of said image carrier by reversal development.

6. An apparatus according to claim 5, wherein said developing means has a function of making visible the electrostatic latent image formed on the surface of said image carrier and cleaning said image carrier so as to remove a developing agent remaining thereon.

7. A laser printer comprising:
- an image carrier on which an electrostatic latent image is to be formed;
- charging means for uniformly charging a surface of said image carrier;
- electrostatic latent image forming means for forming the electrostatic latent image on the surface of said image carrier charged by said charging means;
- developing means for making visible the electrostatic latent image formed on said image carrier by said electrostatic latent image forming means;
- transfer means for transferring the image made visible by said developing means to a recording medium;
- first and second power supply means for respectively supplying operation voltages to said charging means and said transfer means;
- first and second current detection means for respectively detecting currents flowing from said first and second power supply means to said charging means and said transfer means respectively;
- first and second comparison means for respectively comparing current values detected by said first and second current detection means with corresponding predetermined values; and
- control means for controlling an operation of said electrostatic latent image forming means and said first and second power supply means in accordance with the comparison results from said first and second comparison means respectively.

8. A laser printer according to claim 7, further comprising alarming means for signaling states of currents flowing to said charging means and said transfer means in accordance with the comparison results from said first and second comparison means respectively.

9. A laser printer according to claim 8, wherein, when said first and second comparison means detect that at least one of the current values is lower than the corresponding predetermined value, said control means stops an image forming operation of said electrostatic latent image forming means and causes said alarming means to signal that a current flowing to said charging means and/or said transfer means is abnormal.

10. A laser printer according to claim 9, wherein said alarming means comprises an operation display unit for displaying states of currents flowing to said charging means and said transfer means.

11. A laser printer according to claim 10, wherein said developing means makes visible electrostatic latent image formed on said image carrier by reversal development.

12. A laser printer according to claim 11, wherein said developing means has a function of making visible the electrostatic latent image formed on the surface of said image carrier and cleaning said image carrier so as to remove a developing agent remaining thereon.

13. A laser printer according to claim 12, further comprising third power supply means for supplying an operation voltage to said developing means, third current detection means for detecting a current flowing from said third power supply means to said developing means, and third comparison means for comparing a current value detected by said current detection means with a predetermined value, and wherein said control means controls an operation of said electrostatic latent image forming means and said third power supply means in accordance with a comparison result from said third comparison means.

14. A laser printer according to claim 13, wherein when said first, second, and third comparison means detect that at least one of the current values is lower than the predetermined value, said control means stops an image forming operation of said electrostatic latent image forming means, and causes said alarming means to signal that a current flowing to said charging means, said developing means, and/or said transfer means is abnormal.

15. A laser printer according to claim 14, wherein said electrostatic latent image forming means comprises a semiconductor laser oscillator for generating a laser beam, a lens system for focusing the laser beam output from said semiconductor laser oscillator, a polygonal rotary mirror for scanning the laser beam focused by said lens system, a reflection mirror for guiding the laser beam scanned by said rotary mirror toward the surface of said image carrier, and a correction lens.

16. An image forming apparatus comprising:

an image carrier on which an electrostatic latent image is to be formed;

electrostatic latent image forming means for forming the electrostatic latent image on the surface of said image carrier;

developing means for making visible the electrostatic latent image formed on said image carrier by said electrostatic latent image forming means;

transfer means for transferring the image made visible by said developing means to a recording medium;

power supply means supplying an operation voltage to said transfer means;

current detection means for detecting a current value flowing from said power supply means to said transfer means;

comparison means for comparing the current value detected by said current detection means with a corresponding predetermined value; and control means for controlling the operation of said electrostatic latent image forming means and said power supply means in response to the respective comparison results from said comparison means.

17. An image forming apparatus according to claim 16, further comprising alarming means for signaling states of the current flowing to said transfer means in accordance with the comparison result from said comparison means.

18. An image forming apparatus according to claim 17, wherein, when said comparison means detect that the current value is lower than the corresponding predetermined value, said control means stops the image forming operation of said electrostatic latent image forming means and causes said alarming means to signal that a current flowing to said transfer means is abnormal.

19. An image forming apparatus according to claim 18, wherein said alarming means comprises an operation display unit for displaying the states of the current flowing to said transfer means.

20. An image forming apparatus according to claim 19, wherein said developing means makes visible the electrostatic latent image formed on said image carrier by reversal development.

21. An image forming apparatus according to claim 20, wherein said developing means make visible the electrostatic latent image formed on the surface of said image carrier and cleans said image carrier, so as to remove any developing agent remaining thereon.

* * * * *